US009889575B2

(12) United States Patent
Swiatowy et al.

(10) Patent No.: US 9,889,575 B2
(45) Date of Patent: Feb. 13, 2018

(54) WIRE SAW FOR CUTTING PIPE

(71) Applicant: ILLINOIS TOOL WORKS INC., Glenview, IL (US)

(72) Inventors: Jeffrey Michael Swiatowy, Crystal Lake, IL (US); Michael W. Gearhart, Prospect Heights, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 71 days.

(21) Appl. No.: 14/880,810

(22) Filed: Oct. 12, 2015

(65) Prior Publication Data

US 2016/0039106 A1 Feb. 11, 2016

Related U.S. Application Data

(63) Continuation of application No. 13/607,461, filed on Sep. 7, 2012, now Pat. No. 9,186,805.

(Continued)

(51) Int. Cl.
*B26D 7/02* (2006.01)
*B26D 3/16* (2006.01)
(Continued)

(52) U.S. Cl.
CPC ............ *B26D 3/16* (2013.01); *B23D 57/0007* (2013.01); *B23D 57/0038* (2013.01);
(Continued)

(58) Field of Classification Search
CPC ............ B23D 57/0007; B23D 57/0061; B23D 57/0069; B23D 59/04; B26D 1/48; B26D 1/547

See application file for complete search history.

(56) References Cited

U.S. PATENT DOCUMENTS 2,711,761 A 6/1955 Grants
3,820,424 A 6/1974 George, Jr.
(Continued)

FOREIGN PATENT DOCUMENTS

AU 2010 201 367 A1 11/2010
CN 200957639 Y 10/2007
(Continued)

OTHER PUBLICATIONS

International Search Report and Written Opinion for PCT/US2014/059619 dated Jan. 28, 2015, 11 pages.
(Continued)

*Primary Examiner* — Tara Mayo-Pinnock
(74) *Attorney, Agent, or Firm* — Klintworth & Rozenblat IP LLP

(57) ABSTRACT

A wire saw for cutting pipe is provided including a saddle forming a saddle surface for abutting against a cylindrical pipe, an elongate guide fixed to the saddle, a bow having a first and second end, a bridge portion joining the first and second ends, and an open end having a length L from the first end to the second end which is greater than a diameter D of the pipe, a wire loop movable along a track formed within the bow, and a cooling system for actively cooling the wire loop. The elongate guide has an axis approximately perpendicular to an axis of the pipe when the pipe is abutting against the saddle. An exposed portion of the wire loop extends across the open end. The bow is moveable on the elongate guide toward and away from the pipe when the pipe is abutting against the saddle.

28 Claims, 19 Drawing Sheets

Related U.S. Application Data

(60) Provisional application No. 61/542,961, filed on Oct. 4, 2011, provisional application No. 61/532,315, filed on Sep. 8, 2011.

(51) Int. Cl.

| | | |
|---|---|---|
| *B23D 57/00* | (2006.01) | |
| *B23D 59/04* | (2006.01) | |
| *B26D 1/48* | (2006.01) | |
| *B23Q 11/12* | (2006.01) | |

(52) U.S. Cl.
CPC ..... *B23D 57/0053* (2013.01); *B23D 57/0061* (2013.01); *B23D 57/0069* (2013.01); *B23D 57/0084* (2013.01); *B23D 59/04* (2013.01); *B23Q 11/126* (2013.01); *B26D 1/48* (2013.01); *Y10T 83/7487* (2015.04)

(56) References Cited

U.S. PATENT DOCUMENTS

| | | |
|---|---|---|
| 3,958,332 A | 5/1976 | Gates |
| 4,091,533 A | 5/1978 | Saumell |
| 4,212,104 A | 7/1980 | Wikoff |
| 4,449,271 A | 5/1984 | Karubian |
| 4,463,638 A | 8/1984 | Fortin |
| H000045 H | 4/1986 | Gilmore |
| 5,363,558 A | 11/1994 | Schroeder |
| 5,524,517 A | 6/1996 | Robinson |
| 6,267,037 B1 | 7/2001 | McCoy, Jr. |
| 7,406,905 B2 | 8/2008 | Lawler et al. |
| 7,645,093 B1 | 1/2010 | Clark et al. |
| 7,922,424 B2 | 4/2011 | Clark, II |
| 8,109,693 B1 | 2/2012 | Clark, II |
| 8,286,625 B2 | 10/2012 | Jenkins |
| 8,465,227 B1 | 6/2013 | Clark, II |
| 8,475,081 B2 | 7/2013 | Clark et al. |
| 8,651,098 B2 | 2/2014 | Shae |
| 8,833,219 B2 | 9/2014 | Pierce |
| 9,186,805 B2 | 11/2015 | Switatowy |
| 2008/0022830 A1 | 1/2008 | Lawler et al. |
| 2009/0314149 A1 | 12/2009 | Clark, II |
| 2010/0186564 A1 | 7/2010 | Pierce |
| 2013/0061730 A1 | 3/2013 | Swiatowy |
| 2014/0352506 A1 | 12/2014 | Harper |
| 2015/0027287 A1 | 1/2015 | Harper |

FOREIGN PATENT DOCUMENTS

| | | |
|---|---|---|
| CN | 102046316 A | 5/2011 |
| CN | 102067288 A | 5/2011 |
| DE | 10 2004 018672 A1 | 11/2005 |
| EP | 1 598 161 A1 | 11/2005 |
| GB | 2394694 | 5/2004 |
| JP | H01 223294 A | 9/1989 |
| JP | 07150775 | 6/1995 |
| JP | 2012 135872 A | 7/2012 |
| KR | 20090105764 | 10/2009 |
| KR | 2010027354 | 3/2010 |
| SU | 1662866 A1 | 7/1991 |
| WO | 2009146294 | 12/2009 |

OTHER PUBLICATIONS

Australian Examination Report in connection with Australian Patent Application No. 2010206882 dated Apr. 9, 2014, 6 pages.
European Patent Office, International Searching Authority, International Search Report and Written Opinion for PCT/US2012/058408, dated Dec. 19, 2012.

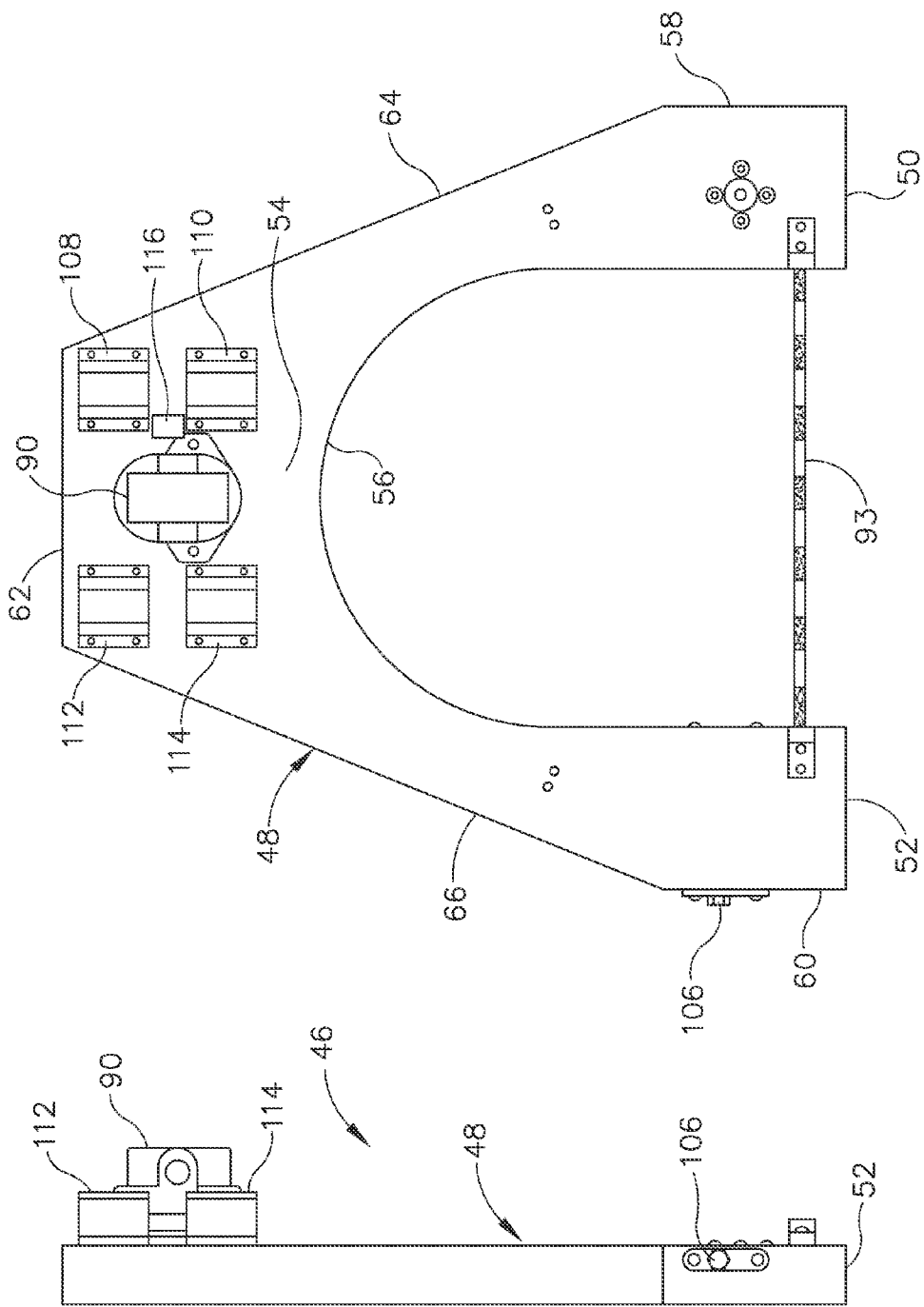

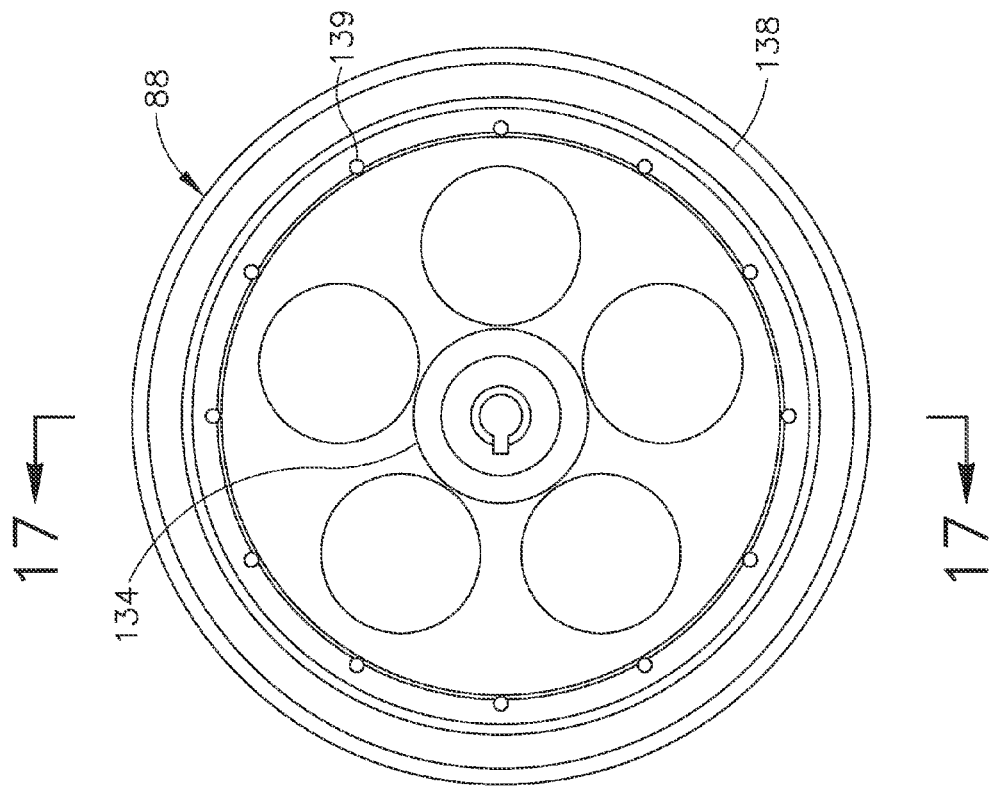
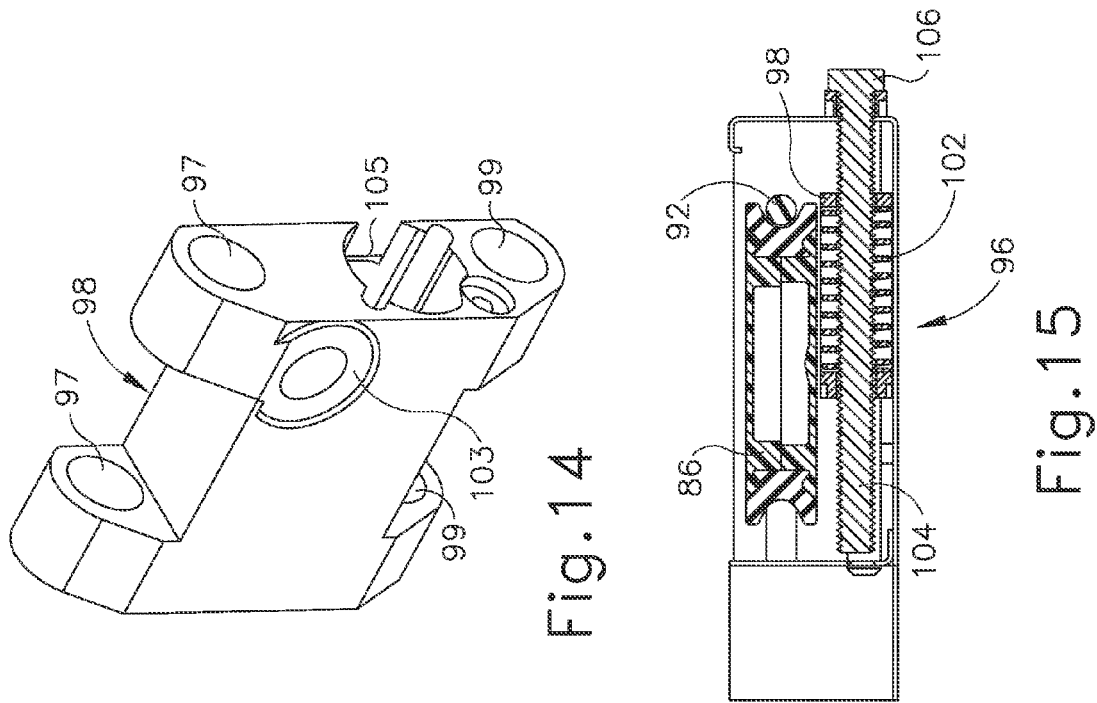
Fig. 16
Fig. 14
Fig. 15

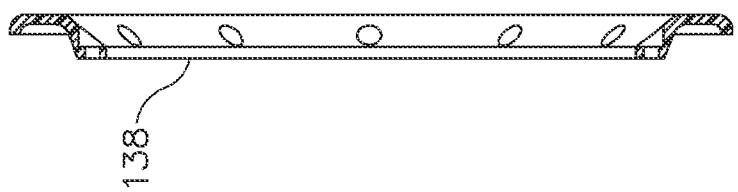
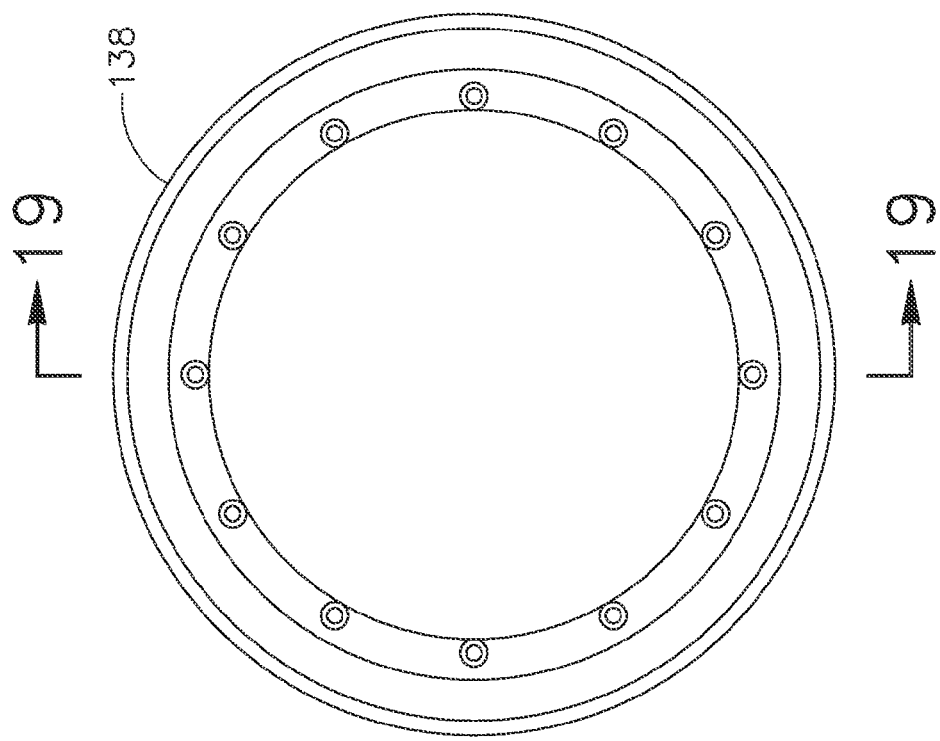
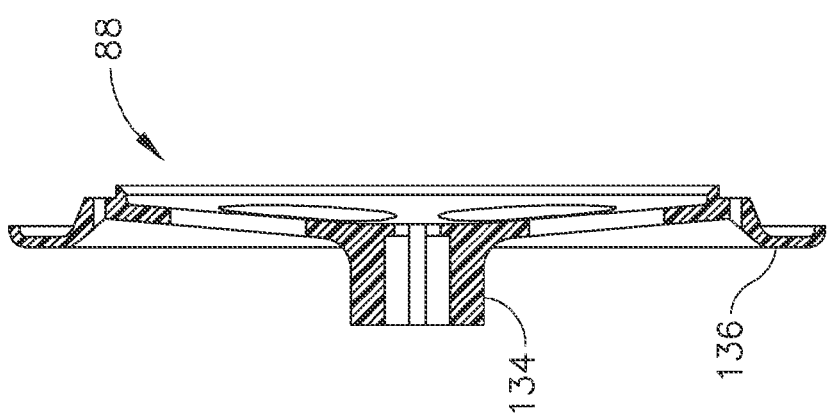

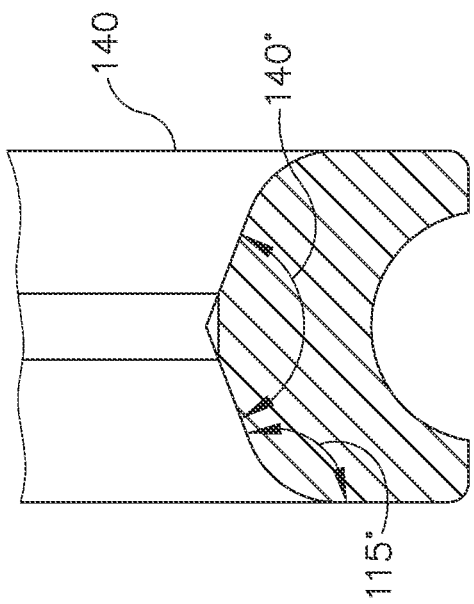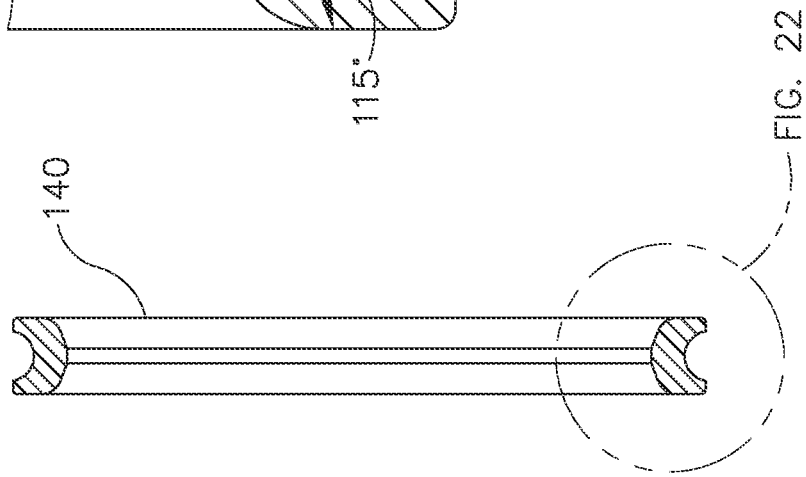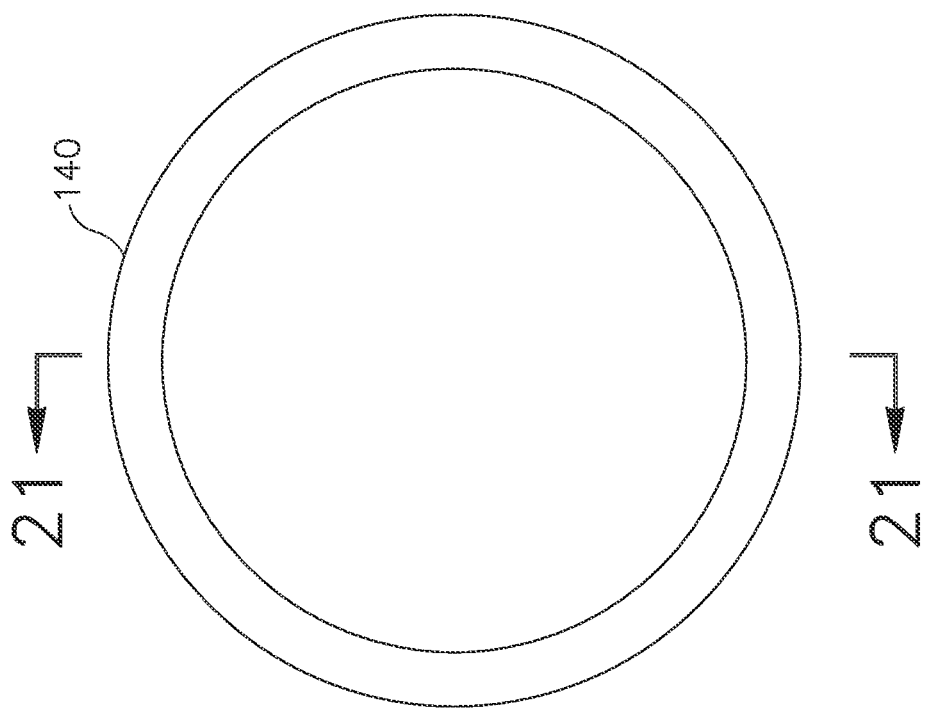

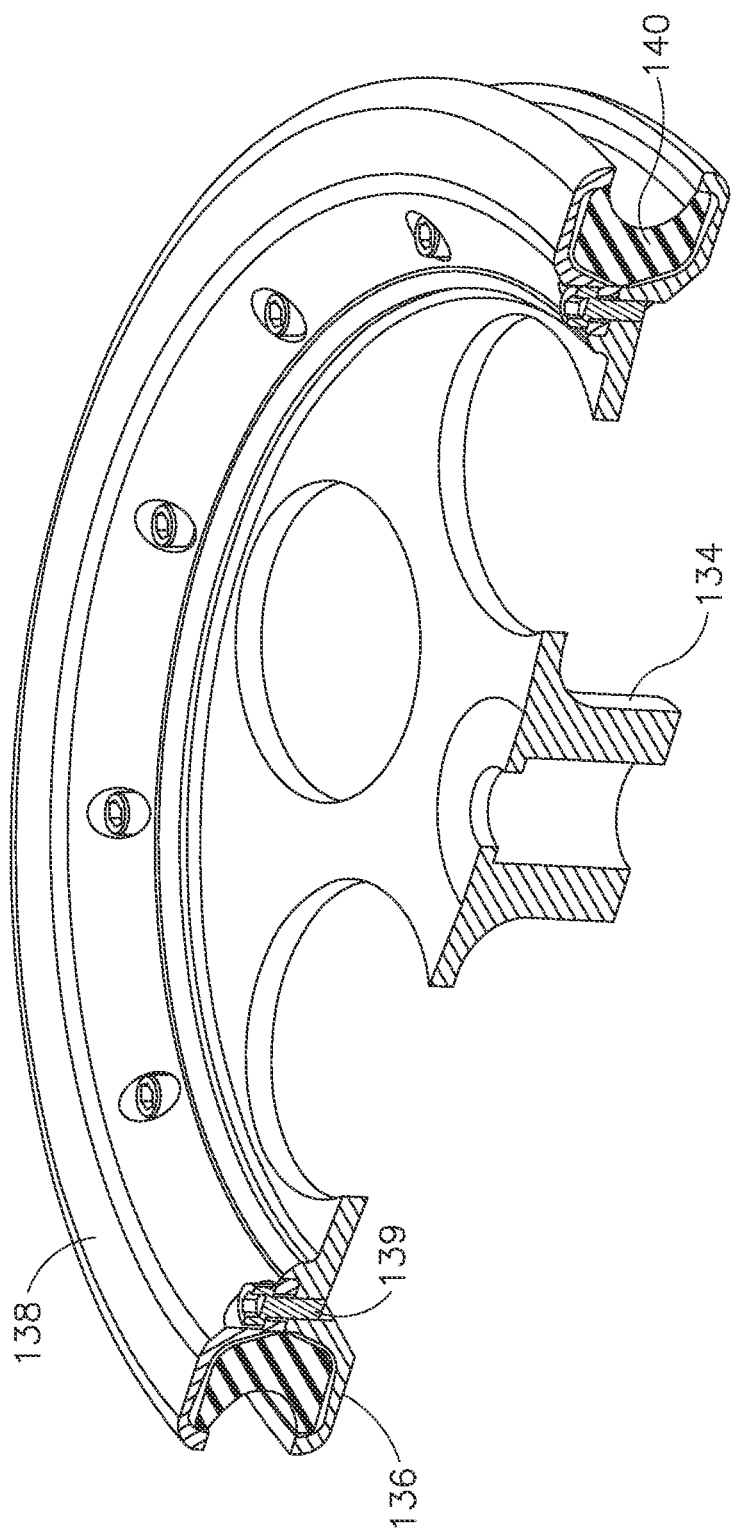

WIRE SAW FOR CUTTING PIPE

CROSS-REFERENCES TO RELATED APPLICATIONS

The Present Application is a continuation of U.S. patent application Ser. No. 13/607,461, filed Sep. 7, 2012, which claims the priority benefit of U.S. Provisional Patent Application No. 61/542,961, filed Oct. 4, 2011, and U.S. Provisional Patent Application No. 61/532,315, filed Sep. 8, 2011, the contents of all of which are hereby incorporated by reference in their entirety to the extent permitted by law.

FIELD OF THE INVENTION

The present invention relates to wire saws and in particular to a wire saw for cutting pipe in the field.

BACKGROUND OF THE INVENTION

Municipalities have extensive networks of piping for controlling the flow of water from storage and pumping stations to users. The network of piping includes numerous valves such that portions of the network can be closed off as needed for service while the remainder of the network remains in operation. The piping required for such networks can range in size from as small as three or four inches in diameter to as large as three feet in diameter. The piping and the valves of the water system are located below ground and extend throughout the community.

When one of the pipes of a water system fails or changes are made to the distribution network, municipal personnel first isolate a section of piping. One or more valves may be opened or closed to shut down water passing through the affected portion of piping. Thereafter, ground is removed from above, around and under the pipe and the pipe is cut to remove the defective area or install new distribution features (valves or branches). Thereafter, replacement pipes and components are cut and fit into the pipeline void left from the removed section.

Currently, hand held rotary saws are employed to cut pipe in the field for making repairs for municipal water systems. Such hand held rotary saws, however, are dangerous to the operator. Frequently, metal pieces broken loose during the cutting process are tossed into the arms and face of the operator or the cutting media becomes pinched from the compressive loads of the pipeline; the physical limitations of the operator are inadequate to prevent the tool from bucking and becoming a people cutting projectile. It is not uncommon for water system personnel to have scars from injuries incurred as a result of repairing the pipes thereof.

As can be seen, there is a need for an improved saw for use by personnel of water systems, that maintains the desirable features of speed and weight, but safeguards the operator by limiting uncontrolled motion and guarding the cutting media for cutting pipe in the field.

SUMMARY

The present invention is defined by the following claims, and nothing in this section should be taken as a limitation on those claims.

In one aspect, a wire saw including a saddle having a contoured saddle surface for receiving the curved surface of a cylindrical pipe is provided. The wire saw also includes a clamp which extends around the circumference of the pipe to retain the pipe against the saddle surface.

In one aspect, an elongate guide is attached to the saddle that has a longitudinal axis that extends perpendicular to the axis of the pipe, which is retained against the saddle. In one aspect, the wire saw further has a bow having downwardly extending parallel sides, a bridge end joining the upper ends of the parallel sides and the bow has a lower open end. The bow has a plurality of rotatable wheels on which is mounted a wire loop, with the loop configured to have a portion that extends across the open ends of the bow. The bow itself is moveable on the guide toward and away from the pipe while the pipe is against the saddle, and a feed screw for urging the bow toward or away from the pipe. In one aspect, one of the wheels is mounted on a spring loaded tensioning member for applying tension to the diamond wire.

In one aspect, the wire saw includes a water spray mounted on the bow for directing a spray of water against the diamond wire.

In one aspect, a wire saw for cutting pipe is provided. The wire saw includes, but is not limited to, a saddle forming a saddle surface for abutting against a cylindrical pipe, an elongate guide fixed to the saddle, a bow having a first and second end, a bridge portion joining the first and second ends, and an open end having a length L from the first end to the second end which is greater than a diameter D of the pipe, a wire loop movable along a track formed within the bow, and a cooling system for actively cooling the wire loop. The elongate guide has an axis approximately perpendicular to an axis of the pipe when the pipe is abutting against the saddle. An exposed portion of the wire loop extends across the open end. The bow is moveable on the elongate guide toward and away from the pipe when the pipe is abutting against the saddle.

In one aspect, a method for cutting non-submersed pipe is provided. The method includes, but is not limited to, mounting a wire saw onto a non-submersed, cylindrical pipe. The wire saw includes a saddle forming a saddle surface for abutting against the pipe, an elongate guide fixed to the saddle, the elongate guide having an axis approximately perpendicular to an axis of the pipe when the pipe is abutting against the saddle, a bow having a first and second end, a bridge portion joining the first and second ends, and an open end having a length L from the first end to the second end which is greater than a diameter D of the pipe, a wire loop movable along a track formed within the bow, and a cooling system for actively cooling the wire loop. An exposed portion of the wire loop extends across the open end. The bow is moveable on the elongate guide toward and away from the pipe when the pipe is abutting against the saddle. The method further includes, but is not limited to, moving the exposed portion of the wire loop towards the pipe, and cutting through at least a portion of the pipe.

BRIEF DESCRIPTION OF THE DRAWINGS

The invention can be better understood with reference to the following drawings and description. The components in the figures are not necessarily to scale, emphasis instead being placed upon illustrating the principles of the invention.

FIG. 12 depicts a side elevational view of the bow shown in FIG. 9, in accordance with one embodiment.

FIG. 13 depicts a rear view of the bow shown in FIG. 9, in accordance with one embodiment.

FIG. 14 depicts an isometric view of the tensioner slide within the bow shown in FIG. 9, in accordance with one embodiment.

FIG. 15 depicts an enlarged cross-sectional view of the tensioner system, the cross-section taken through line 15-15 of FIG. 10, the tensioner system applying tension to the wire loop in the bow shown in FIG. 9, in accordance with one embodiment.

FIG. 16 depicts a front elevational view of the drive wheel hub axle rim portion for driving the wire loop in the bow, in accordance with one embodiment.

FIG. 17 depicts a cross-sectional view of the drive wheel section shown in FIG. 16, in accordance with one embodiment.

FIG. 18 depicts a front elevational view of the drive wheel rim that attaches to the rim portion shown in FIG. 16 to form the drive wheel, in accordance with one embodiment.

FIG. 19 depicts a cross-sectional view of the rim portion shown in FIG. 18, in accordance with one embodiment.

FIG. 20 depicts a front elevational view of the inset for the wheel formed by assembling the parts shown in FIGS. 16 and 18, in accordance with one embodiment.

FIG. 21 depicts a cross-sectional view of the insert shown in FIG. 20, in accordance with one embodiment.

FIG. 22 depicts a fragmentary enlargement of FIG. 21 showing the cross-sectional shape of the insert, in accordance with one embodiment.

FIG. 23 depicts an isometric cross-sectional view of the wheel assembled from the parts shown in FIGS. 16, 18, and 20, in accordance with one embodiment.

DETAILED DESCRIPTION

Figure 1:
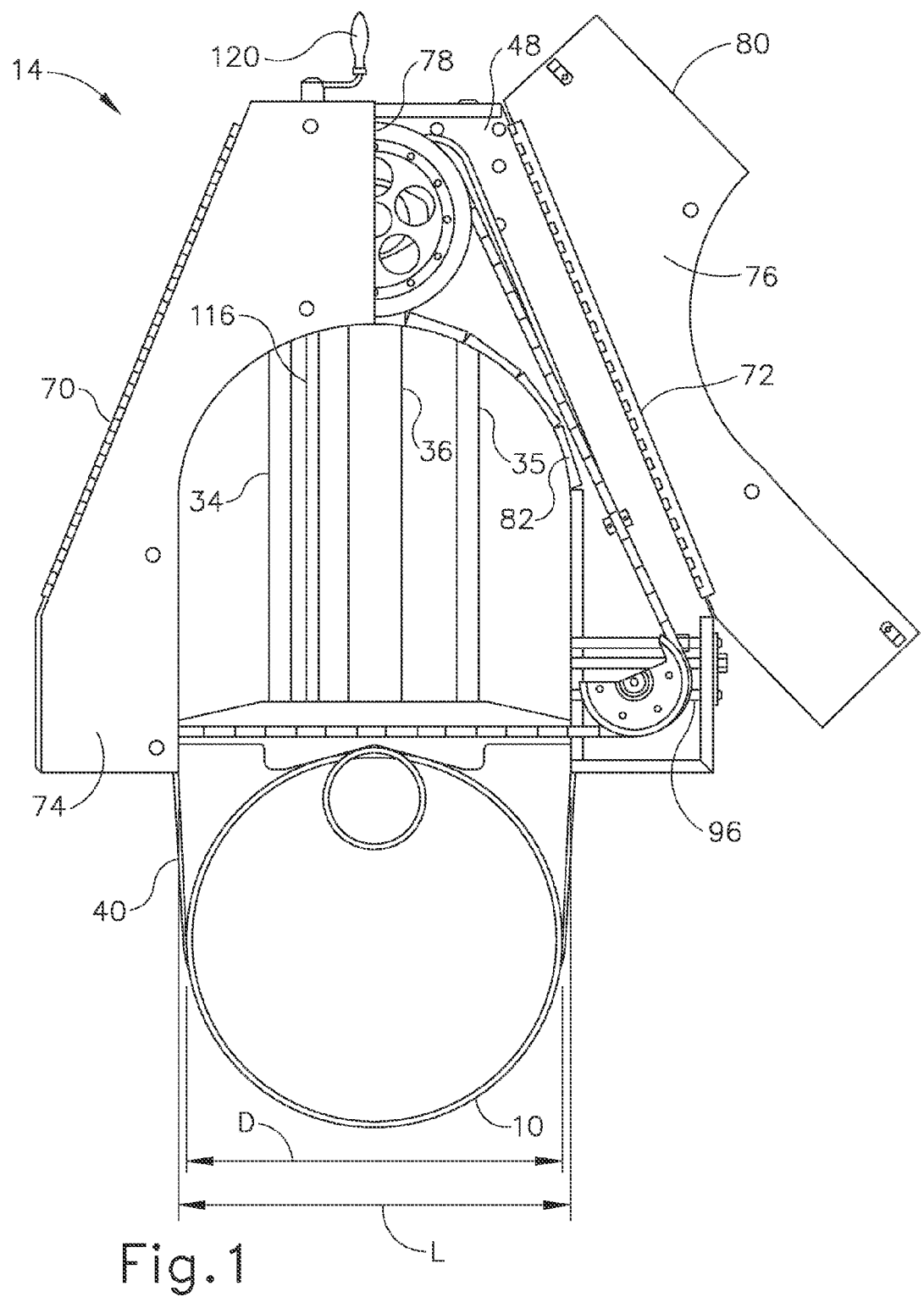
FIG. 1 depicts a front elevational view of a device shaped to a pipe to be cut, in accordance with one embodiment.
Figure 2:
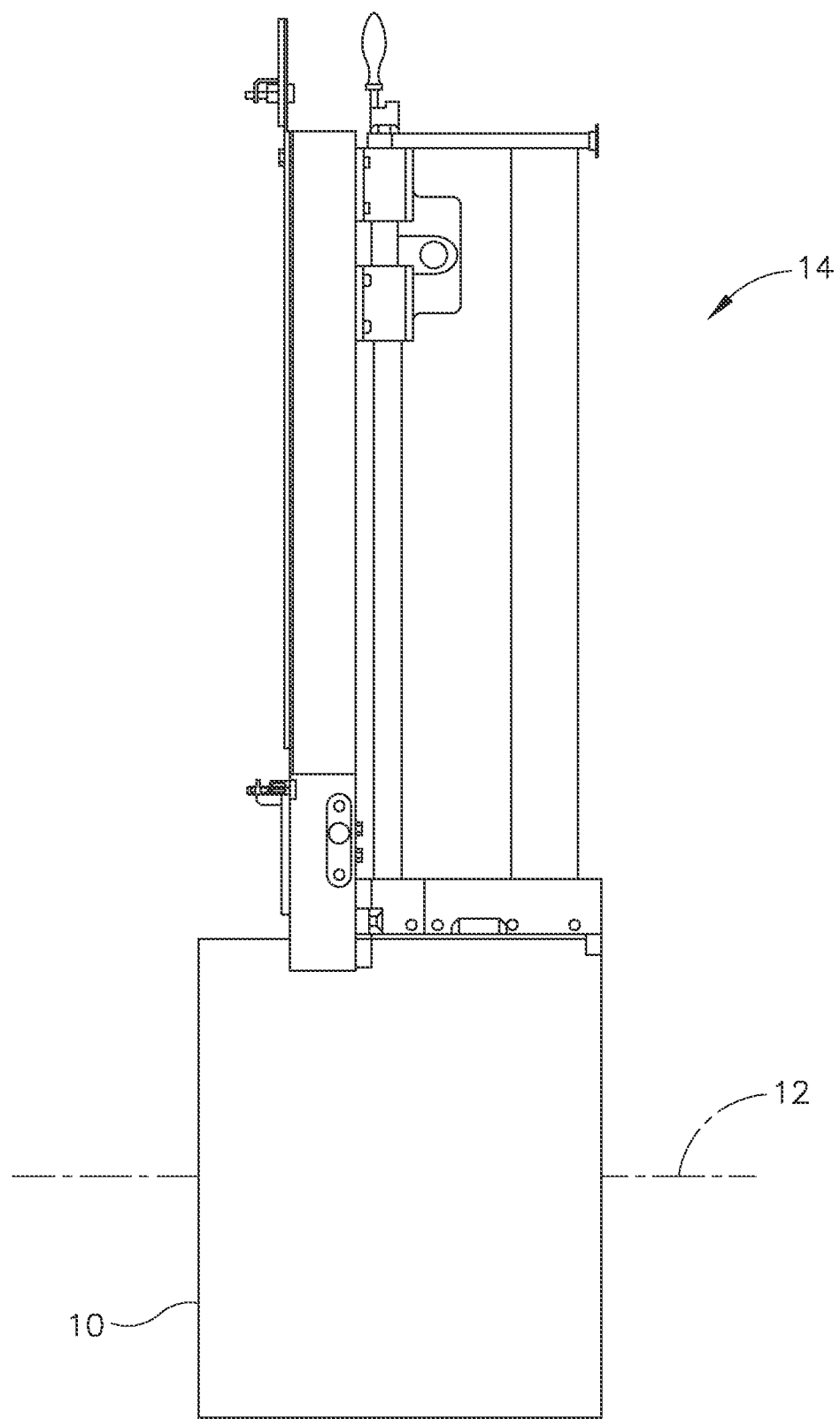
FIG. 2 depicts a side elevational view of the device and pipe shown in FIG. 1, in accordance with one embodiment.
Figure 3:
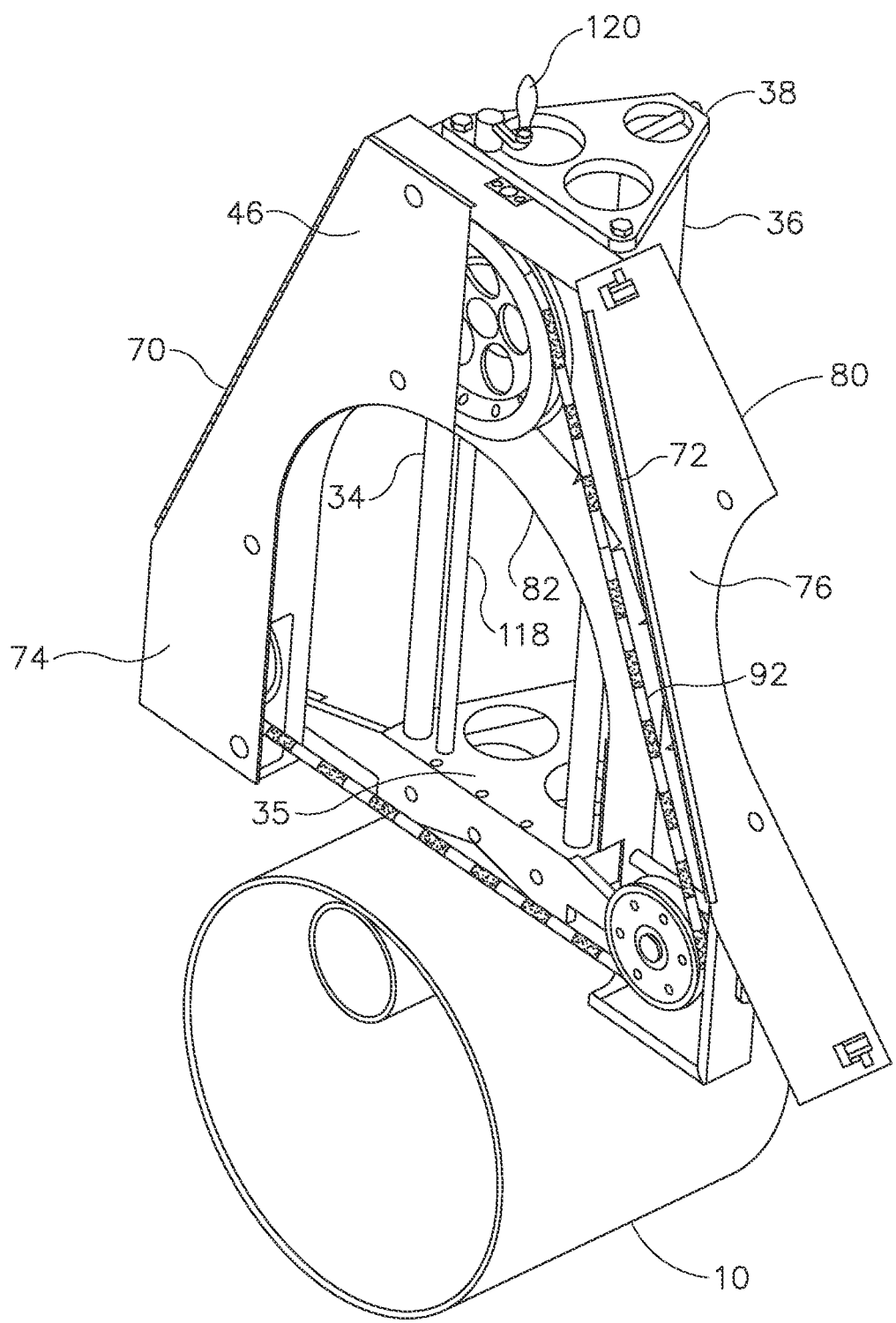
FIG. 3 depicts an isometric view of the device and pipe shown in FIG. 1, in accordance with one embodiment.
Figure 4:
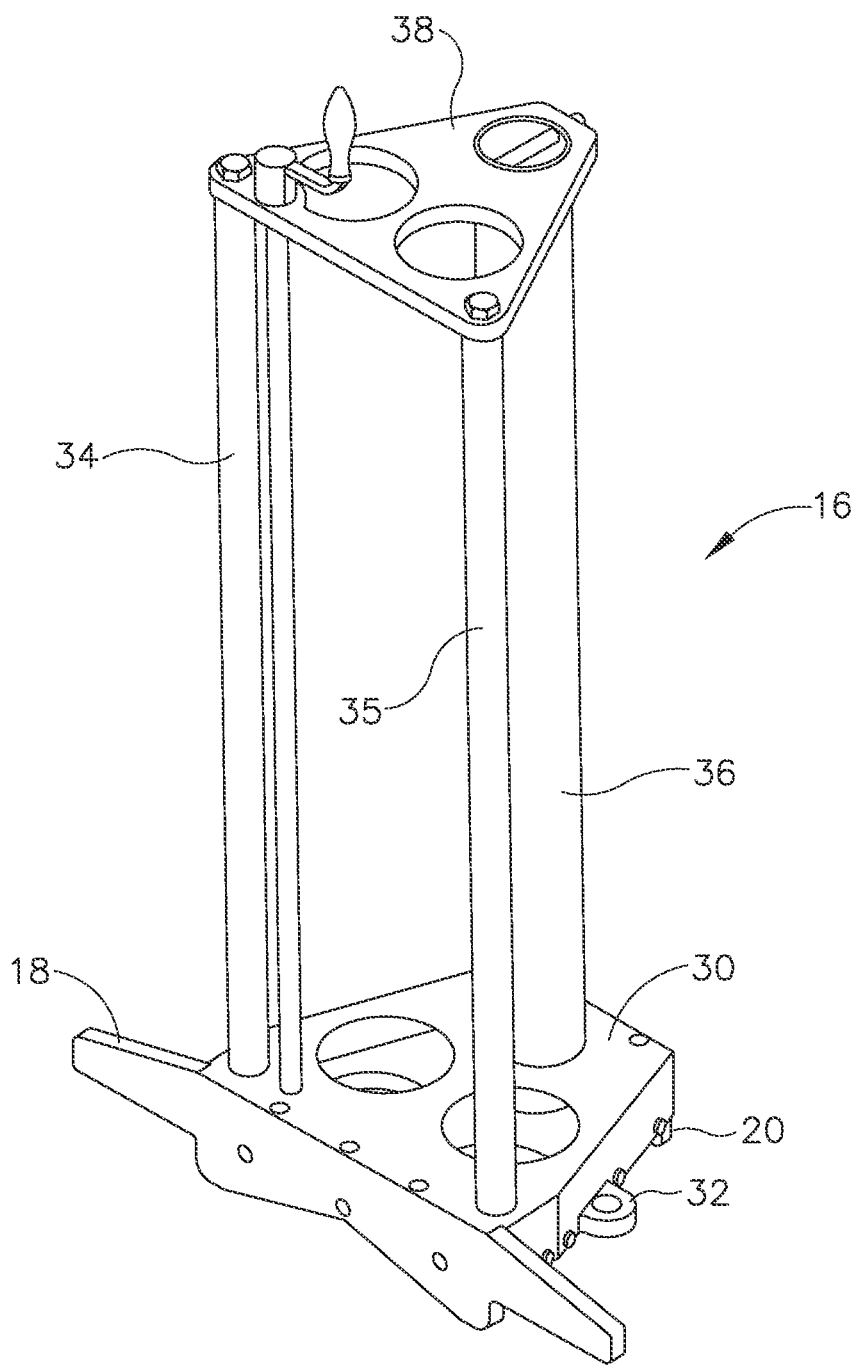
FIG. 4 depicts an isometric view of the saddle and guide assembly that forms a part of the device shown in FIG. 1, in accordance with one embodiment.
Figure 5:
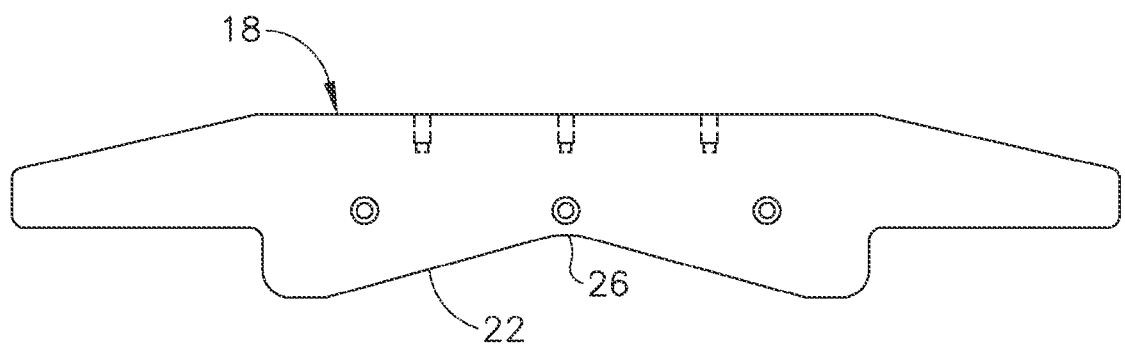
FIG. 5 depicts a front elevational view of the front saddle plate for the saddle and guide assembly shown in FIG. 4, in accordance with one embodiment.
Figure 6:
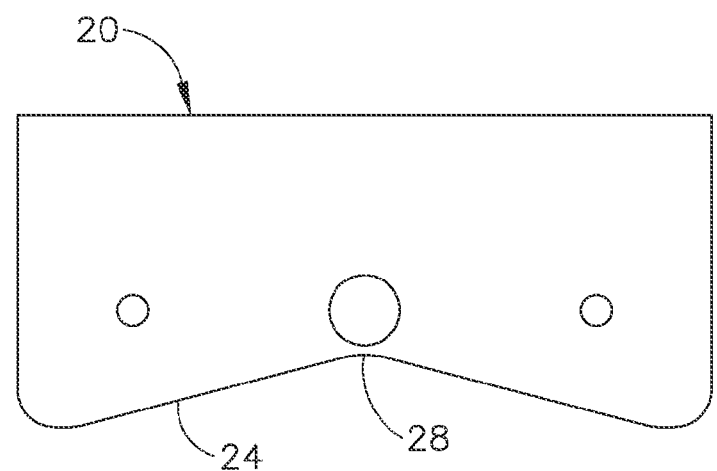
FIG. 6 depicts a front elevational view of the rear saddle plate for the device shown in FIG. 4, in accordance with one embodiment.
Figure 7:
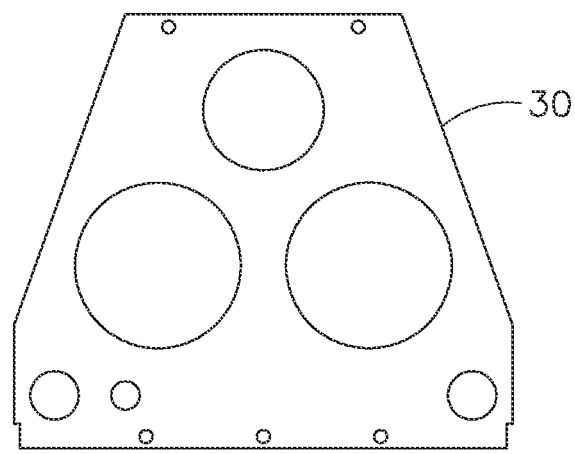
FIG. 7 depicts a top view of the upper saddle retaining plate for the device shown in FIG. 4, in accordance with one embodiment.

With reference to FIGS. 1, 2 and 3, to cut a length of steel pipe 10 having a longitudinal axis 12, a cutting device 14 in accordance with the present invention is provided. Preferably, the steel pipe is cylindrical pipe, and preferably, un-submersed pipe. The device 14 is normally used by positioning the device 14 above the length of pipe 10 in the orientation depicted in FIGS. 1, 2, and 3 and for the purposes of this discussion the elements of the device 14 that are shown at the upper end of the figures will be described as being at the upper end or upward of elements that are shown in the lower portions of figures. The lower elements will be described as being at the lower end or below the upper elements. Similarly, the portions of the device 14 depicted on the left side of FIG. 2, and visible in FIG. 1 will be described as being forward and the portions of the device 14 depicted on the right side of FIG. 2 will be described as being rearward or behind the forward portions.

With reference to FIGS. 1 through 8, a central portion of the device 14 is a saddle and guide assembly 16. The saddle and guide assembly 16 includes a saddle or saddle portion, preferably formed by first and second parallel saddle portions or plates 18, 20 each of which has a contoured lower surface, or saddle surface, 22, 24 shaped to abut against the outer surface of a length of pipe 10. In the preferred embodiment, the contoured surface 22, 24 has parallel sloping sides that slope toward a central groove 26, 28. The saddle portions 18, 20 are retained parallel to each other by upper and lower retaining plates 30, 32.

Figure 8:
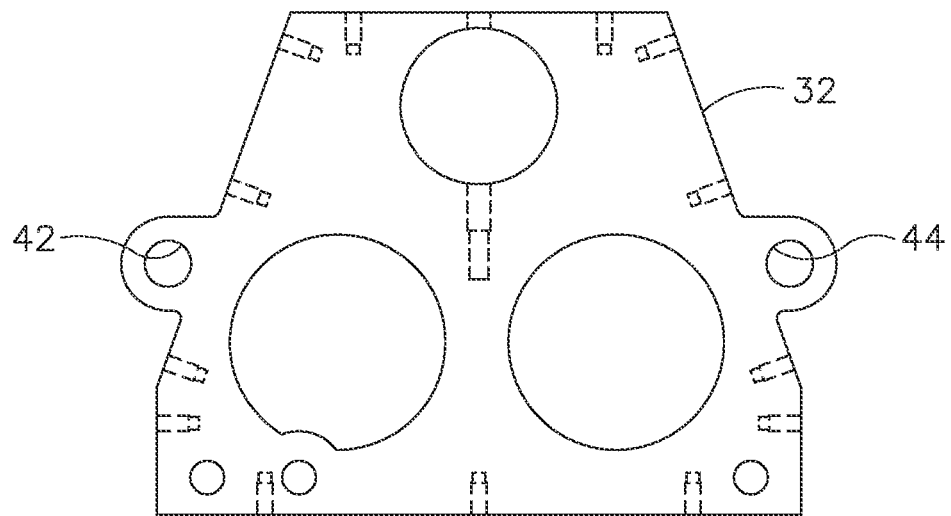
FIG. 8 depicts a top view of the lower saddle retaining plate for the device shown in FIG. 4, in accordance with one embodiment.

Extending parallel to the saddle portions 18, 20 and perpendicular to the retaining plates 30, 32 are a plurality of longitudinal supports 34, 35, 36, or elongate guides, used to guide a bow 46 toward and away from said pipe 10 while said pipe 10 is against said saddle plates 18, 20. Extending across the upper ends of the longitudinal supports 34, 35, 36 is a guide alignment plate 38 that retains the supports 34, 35, 36 in an approximately parallel relationship. Two of the longitudinal supports 34, 35 are positioned adjacent the forward saddle plate 18 with the third longitudinal support 36 centrally positioned adjacent the rear saddle plate 20. As can be seen, the retaining plates 30, 32 retain the saddle plates 18, 20 with the central grooves 26, 28 aligned with each other for retaining the pipe 10 with the axis 12 thereof in an orientation perpendicular to the supports 34, 35, 36. With reference to FIGS. 1 and 8, an adjustable strap 40 of the type well known in the art has a first and second end, each of which attaches to an eyehole 42, 44 in the lower retaining plate 32 such that the strap 40 can be wrapped around the circumference of a pipe 10 and tightened to retain the pipe 10 with the axis thereof perpendicular to the longitudinal supports 34, 35, 36.

Figure 24:
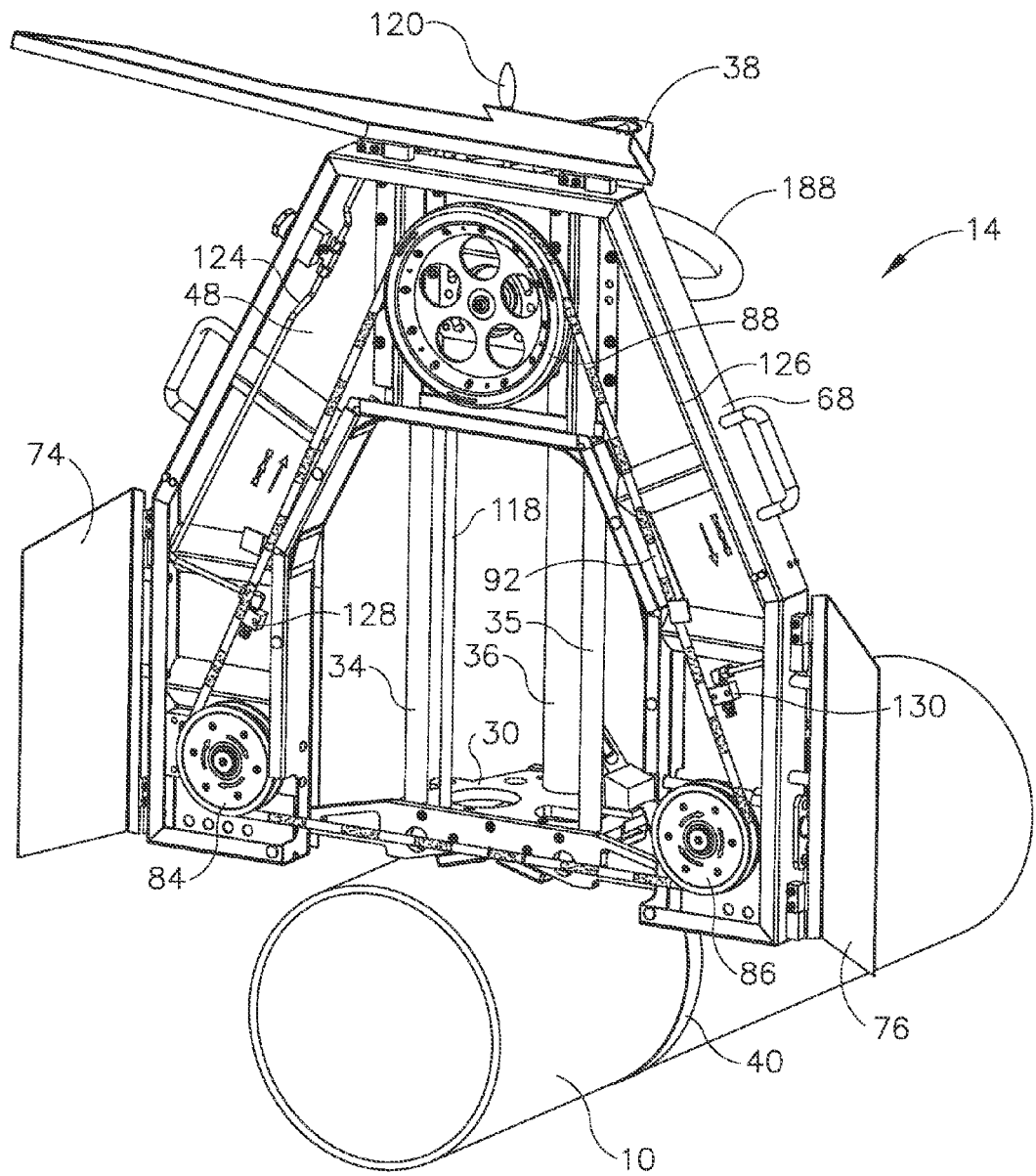
FIG. 24 depicts a perspective view of a device shaped to a pipe to be cut, in accordance with one embodiment.
Figure 25:
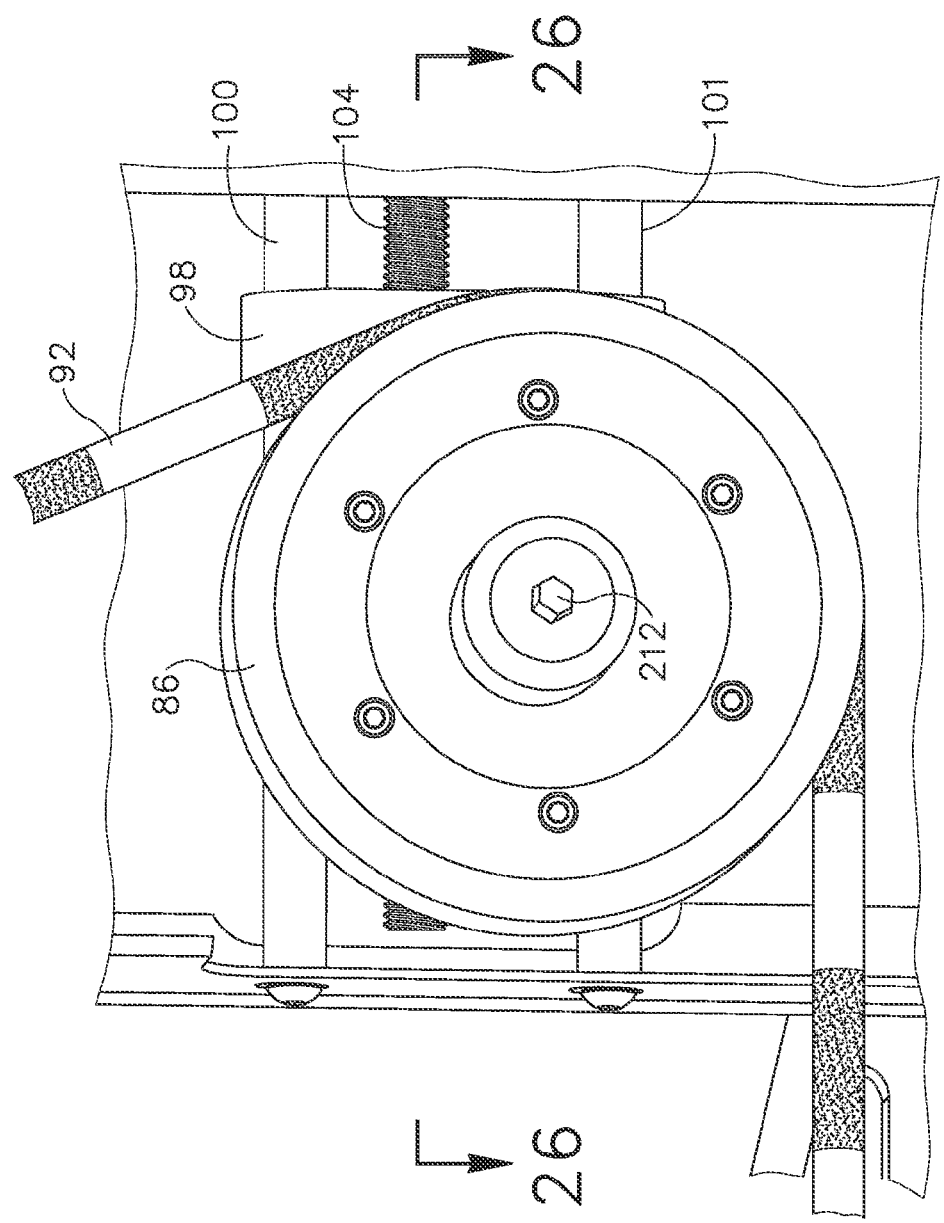
FIG. 25 depicts a fragmentary enlargement of FIG. 24 showing a tensioning device in a bow of a cutting device, in accordance with one embodiment.
Figure 26:
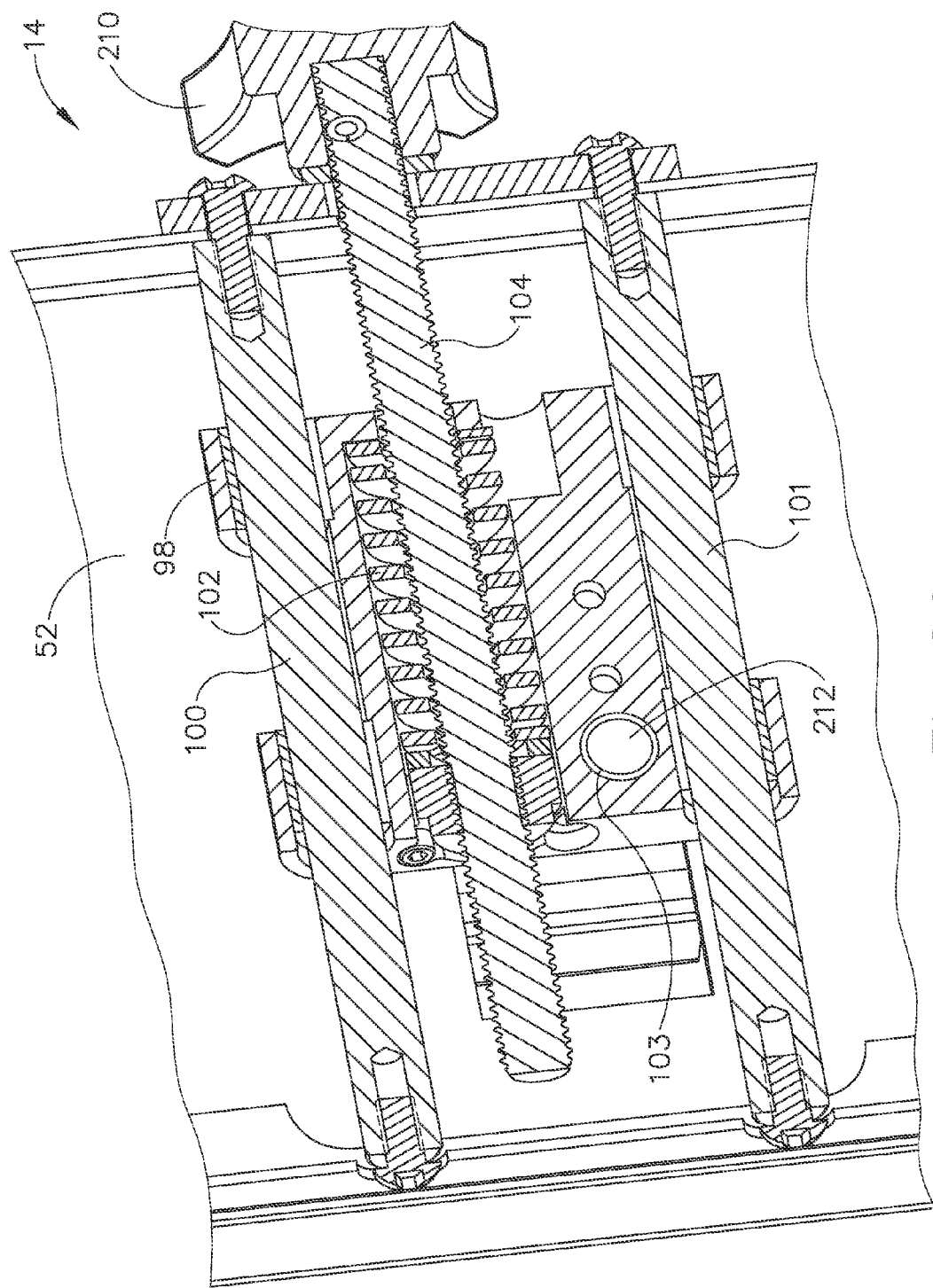
FIG. 26 an enlarged cross-sectional view of a tensioner system, the cross-section taken through line 26-26 of FIG. 25, the tensioner system applying tension to the wire loop in the bow, in accordance with one embodiment.

With reference to FIGS. 3, 4, 9, 10, and 13, slideably receivable along the longitudinal supports 34, 35 forward of the forward saddle plate 18 is a U-shaped bow 46. The bow 46 has a metal housing and includes a U-shaped base plate 48 having parallel lower ends 50, 52 that extend parallel to each other and are joined by a centrally located bridge portion 54. The bow 46 also has an arcuate inner edge 56 that joins the lower ends 50, 52. The outer edge of the base plate 48 includes parallel planar lower sides 58, 60 and extending from the lower sides 58, 60 to a transverse upper end 62, tapered sides 64, 66. Extending around the outer edges of the base plate 48 is an edge wall 68. Mounted on hinges 70, 72 on each edge wall 68 for the tapered sides 64, 66 are forward panels 74, 76. Preferably, when the panels 74, 76 are closed against the edge wall 68, central edges 78, 80 of the forward panel 74, 76 abut each other such that the combined panels 74, 76 form a surface complementary in shape to the base plate 48 and covering the forward end of the bow 46. In one embodiment, each panel 74, 76 is a single piece, as shown in FIG. 1, and in another embodiment, each panel 74, 76 comprises multiple pieces, as shown in FIG. 24. Extending around the arcuate edge 56 of the base plate 48, but stopping short of the lower ends 50, 52 is an inner guard 82. Except for apertures below the lower ends of the inner guard 82, the housing formed by the base plate 48, the edge wall 68, the inner guard 82 and forward panels 74, 76 completely enclose the working parts therein.

The device 14 includes a flexible cutting member movable along a track formed within the bow 46. Preferably, the cutting member is a wire loop 92, movable along a track formed within the bow 46, and preferably a diamond wire loop or a wire loop 92 containing diamond pieces or diamond dust. However, other cutting member may be used, such as high carbon wire members, carbon fiber wire cutting members, and the like. Preferably, an exposed portion of the cutting member extends across an open end of the bow 46 formed between the two ends 50, 52 of the bow 46. With reference to FIG. 1, preferably, the open end of the bow 46 has a length L from the first lower end 50 to the second lower end 52 which is greater than a diameter D of the pipe 10.

Figure 9:
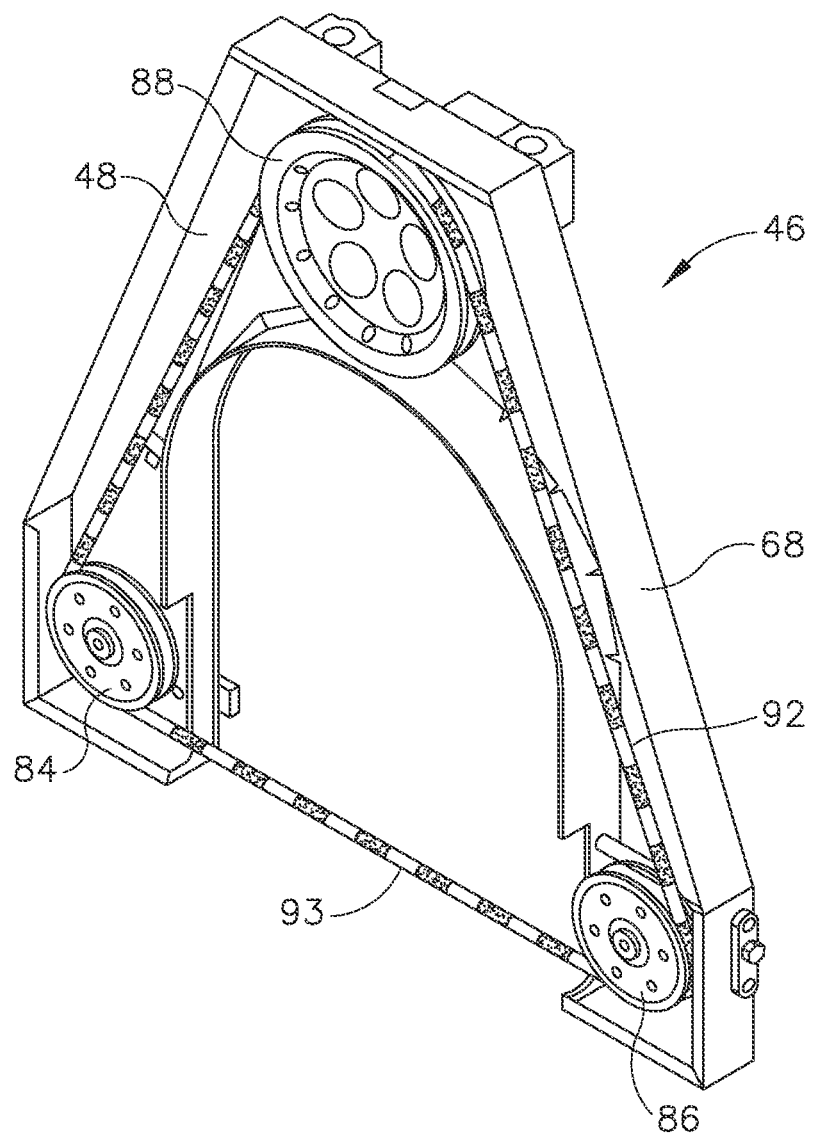
FIG. 9 depicts an isometric view showing the bow of the device shown in FIG. 4 with the front covers removed, in accordance with one embodiment.
Figure 10:
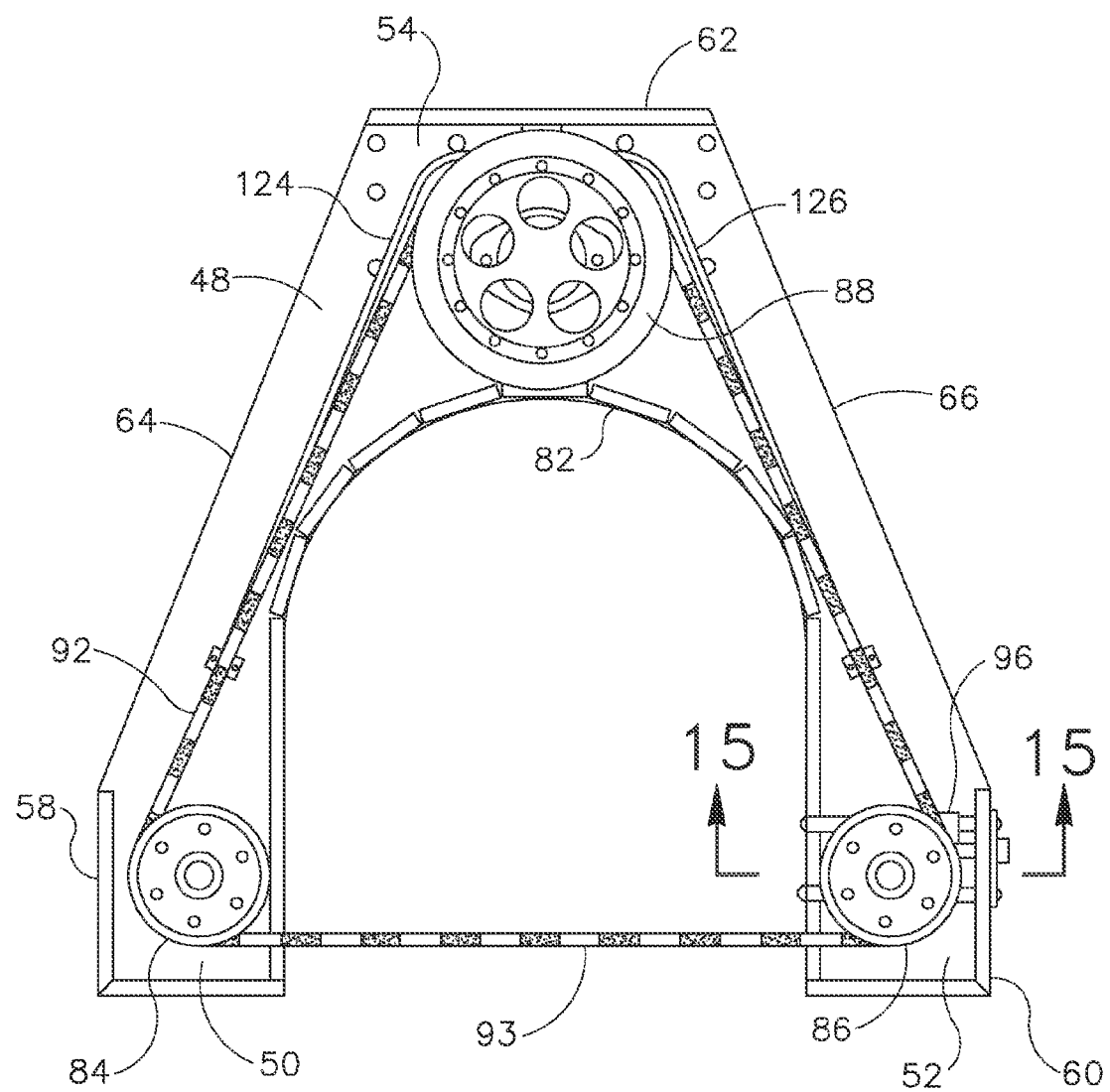
FIG. 10 depicts a front elevational view of the bow for the device shown in FIG. 4 with both front covers removed, in accordance with one embodiment.
Figure 10A:
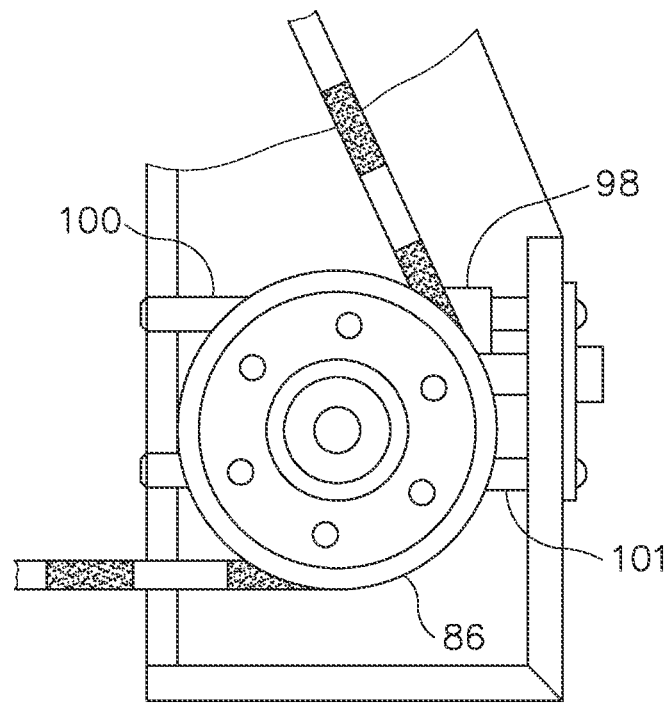
FIG. 10A depicts a fragmentary enlargement of FIG.10 showing the tensioning device in the bow, in accordance with one embodiment.

With reference to FIGS. 9, 10 and 13, in one embodiment, the cutting member is a wire loop 92 movable along a track formed within the bow 46. Preferably, within the enclosure of the housing 48 and positioned near each of the lower ends 50, 52, the track is formed using guide wheels 84, 86 rotatable on shafts, unnumbered, along with a drive wheel 88 positioned within the bridge portion 54 of the enclosure and driven by a motor 90 mounted on the rear surface of the base plate 48. Fitted around the drive wheel 88 and guide wheels 84, 86 and movable along the track formed by the wheels 84, 86, 88 is the wire loop 92. As can be seen, the metal housing 48 that forms the bow 46 entirely surrounds the wire loop 92, except for an exposed portion 93 of the wire 92 that extends between the guide wheels 84, 86 and across the lower ends 50, 52 of the bow 46.

With reference to FIGS. 1, 10, 10A, 14, 15, 25, and 26 in one embodiment, device 14 includes a tensioning device which can increase or decrease the tension of wire loop 92. Tensioning device may be any device which can increase or decrease tension on a wire, and in particular, on a wire running along a track. Preferably, the tensioning device increase or decreases an overall length of the track, or changes the configuration of the track, which results in an increase or decrease of tension on the wire loop 92. In one embodiment, the tensioning device is provided by mounting one of the guide wheels 86 on a tensioner device 96. The tensioner device 96 is operable to move the wheel 86 from a first position to a second position, in order to alter the track length. For example, the tensioner device 96 may be operable to move the wheel 86 towards wheel 84 or wheel 88 in order to decrease the length of the track and decrease the tension on the wire loop 92, or move the wheel 86 away from wheel 84 or wheel 88 in order to increase the length of the track and increase the tension on the wire loop 92. Preferably, in accordance with one embodiment, the tensioner device 96 includes a slide member 98 having a pair of aligned apertures 97, and spaced from aligned apertures 97 a second pair of aligned apertures 99 and the pairs of aligned apertures slideably receive parallel bars 100, 101 which extend across the lower end 52 of the base plate 48 perpendicular to the support members 34, 35, 36. The slide member 98 is therefore moveable toward and away from the opposing guide wheel 84. The slide member 98 also has a threaded mounting hole 103 for receiving a shaft 212 on which guide wheel 86 is rotatably mounted.

Preferably, retained in a cavity 105 within the slide member 98, a biasing member, such as a coil spring 102, which biases the wheel 86 away from wheel 84 or wheel 88 in order to maintain a preset amount of tension on the wire loop 92, and prevent too much tension to be applied onto the wire loop 92. Preferably, the wire loop 92 is operated in a preset range of tension in order to increase the life of the wire loop 92. In one embodiment, coil spring 102 is retained in cavity 105 within the slide member 98, and the coil spring 102 has one end that abuts against a portion of the metal housing and the other end of which abuts the slide member 98 for urging the slide member 98 and the guide wheel 86 rotatably attached thereof away from the opposing guide wheel 84 thereby applying tension to the wire loop 92 and helping to maintain the tension on the wire loop within a preset range.

Figure 27:
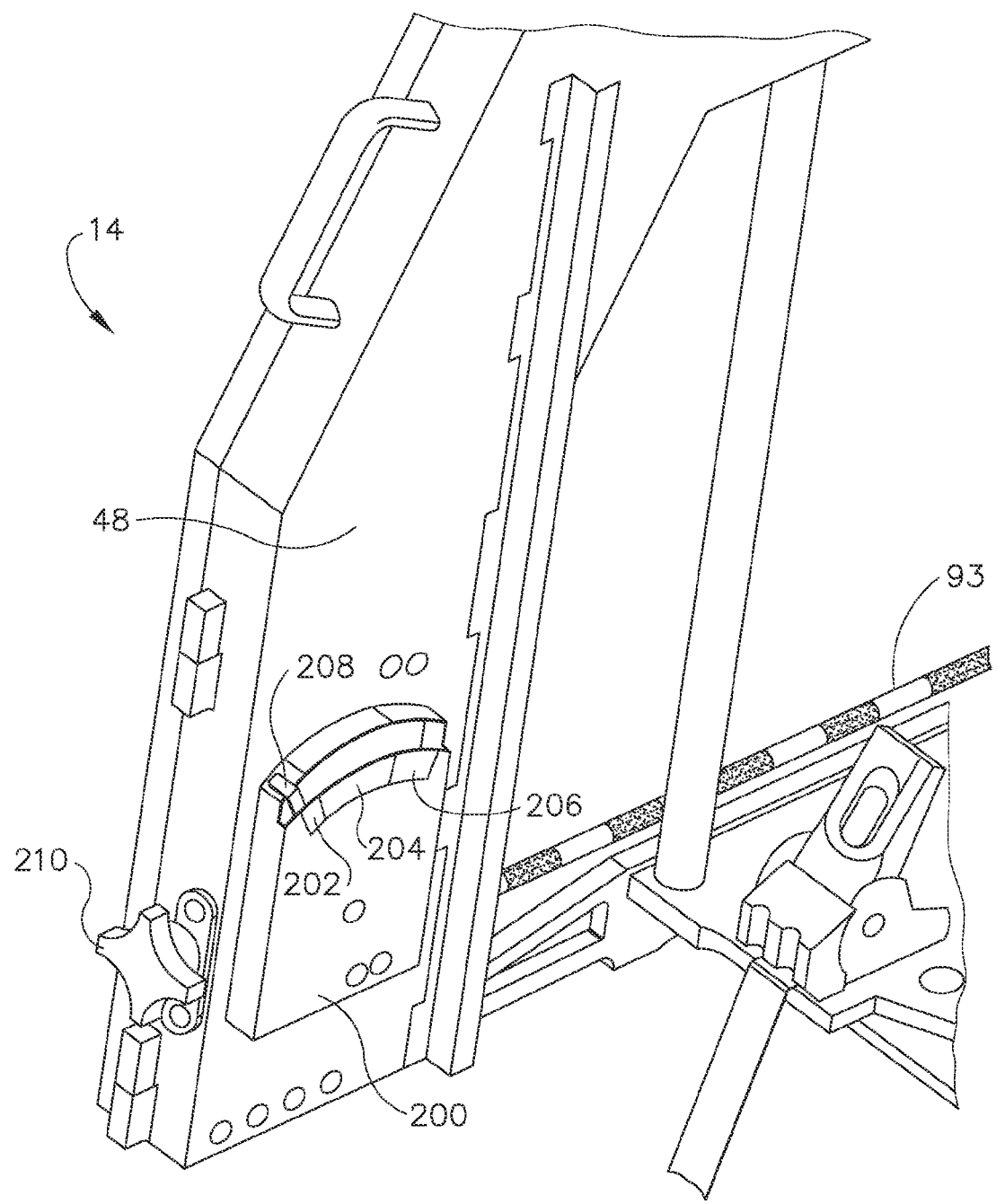
FIG. 27 depicts a rear perspective view of the bow shown in FIG. 24, in accordance with one embodiment.

In one embodiment, the position or range of motion of a guide wheel 84, 86, 88, such as guide wheel 86, relative to the other guide wheels 84, 86, 88, such as wheels 84, 88, is adjustable using an adjustment device of tensioner device 96. Preferably, in accordance with one embodiment, the adjustment device includes an adjustable screw 104 which is rotatably received in a threaded portion of the slide member 98 for adjusting the range of motion of the slide member 98 and thereby adjusting the tension on the wire loop 92. The screw 94 extends through an aperture in the housing 48 (not numbered) so as to be accessible to an operator. In one embodiment, the screw 94 includes a hex head 106 so as to be easily adjustable using a wrench. With reference to FIG. 27, in one embodiment, an adjustment knob 210 is connected with the screw 94 allowing for manual or hand adjustment of the tension on the wire loop 92 by turning the knob, and thereby rotating the screw 94, causing the wheel 86 to move towards or away from wheel 84, and or, wheel 88. Any one of a variety of adjustment devices may be used, either mechanical or electro-mechanical, to adjust the position or range of motion of a guide wheel 84, 86, 88.

With reference to FIG. 13, welded to the rearward surface of the base plate 48 are an upper and lower guide follower 108, 110 for slideably receiving longitudinal support 34 and upper and lower guide followers 112, 114 for slideably receiving longitudinal support 35 such that the bow 46 is vertically slideable along supports 34, 35.

Preferably, the device 14 includes a feed unit for urging the bow 46 toward and away from the pipe 10 when the pipe 10 is abutted against the saddle portion or saddle plates 18, 20. In one embodiment, the feed unit includes a feed nut 116, an elongate feed screw 118, and a manually operable crank 120. The manually operable crank 120 is any type of device, which may be purely mechanical or electro-mechanical, which can be manually controlled and operated by an operator. Preferably, positioned on the rearward surface of the base plate 48, the feed nut 116 threadingly receives the elongate feed screw 118, shown in FIG. 3, that extends parallel to the longitudinal supports 34, 35, 36 and is rotated by the manually operable crank 120 at the upper end thereof.

Figure 11:
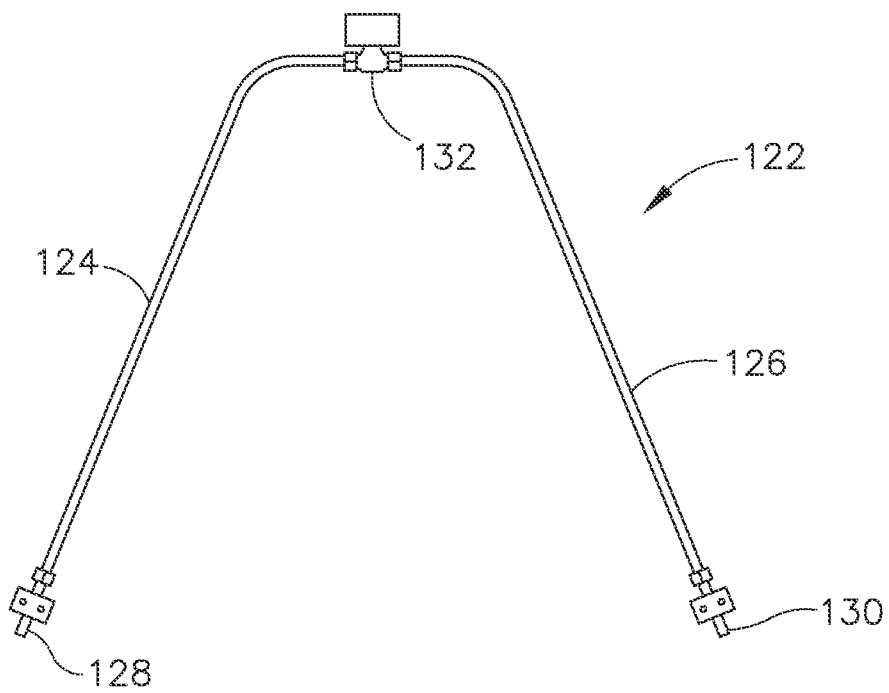
FIG. 11 depicts a front elevational view of the water cooling system within the bow first shown in FIG. 9, in accordance with one embodiment.

With reference to FIGS. 10 and 11, the device 14 further includes a cooling system that extends through the bow 46 for actively cooling the wire loop 92. By having a cooling system for actively cooling the wire loop 92, the device 14 can be used to cut non-submersed pipe 10, that is, pipe 10 which is not already submersed in a liquid, such as undersea piping. Preferably, the housing formed by the base plate 48, the edge wall 68, the inner guard 82 and forward panels 74, 76 completely, or at least partially, encloses the cooling system. In one embodiment, the cooling system is a water cooling system 122 which sprays or applies water onto portions of the wire loop 92. The cooling system may be any device or device which may be used to cool portions of the wire loop 92, and may include any device or devices which spray a variety of different fluids onto the wire loop 92, the fluids may be either liquid or gaseous fluids, to cool the wire loop 92.

In one embodiment, the water cooling system 122 includes first and second access waterlines 124, 126 at the outer ends of which are nozzles 128, 130 that directs a water spray onto the surface of the wire loop 92 as it rotates within the housing 48. The opposite ends of the tubing 124, 126 join together at a T-union 132, with the input for the T-union having a threading thereon for receiving a common garden hose or other source of water. Water from the garden hose 188, as shown in FIG. 24, is therefore directed through the waterlines 124, 126 to the nozzles 128, 130 for cooling the wire loop 92 so that failure of the wire loop 92 is prevented.

With reference to FIGS. 16 through 23, the drive wheel 88 has a centrally located hub portion 134 that is retained by a web, unnumbered, to the inner annular rim 136. Fitted against the inner annular rim 136 is an annular outer rim 138, and between the annular inner and outer rims 136, 138 is an annular insert 140. The annular members 136, 138 are retained together by a plurality of screws 139. Preferably, the insert 140 is made of a malleable material such as rubber for providing force to the wire loop 92.

The idler wheels 84, 86 are identical to each other such that wheel 84 is representative of both. Each of the wheels 84, 86 also has a hub portion that is retained by a web to an annular rearward rim. Fitted against the annular rearward rim 88 is an annular forward rim, and between the inner and outer rims is an annular wire gripping member for receiving and guiding the wire loop. A plurality of screws retain the rims together, all similar to the drive wheel 88.

With reference to FIG. 27, in one embodiment, in order to optimize the cutting performance of the device 14, precise control of entry/exit angles of the wire loop 92 into the pipe 10 as well as precise control of the pressure or tension on the wire loop 92 is required. To achieve this, the tension of the wire loop 92 must be maintained within a predetermined or preferred range of tension. Preferably, a tension indicator, such as a gauge 200, is mounted on the device 14, such as on the rearward surface of the base plate 48, to provide the operator of the device 14 with feedback as to the amount of tension currently on the wire loop 92. The tension indicator, can be any device, such as a mechanical or electro-mechanical gauge, sensor, or display which can indicate to the operator the current tension of the wire loop 92. The tension indicator may be a visual indicator, or any other types of indicator which can communicate to operator information, such as an auditory indicator, or a vibratory indicator. The tension indicator may be used by the operator to either speed or slow the advancement of the bow 46 toward the pipe 10, in order to increase or decrease tension on the wire loop 92 so that it may be maintained within a preferred range of tension.

Figure 28:
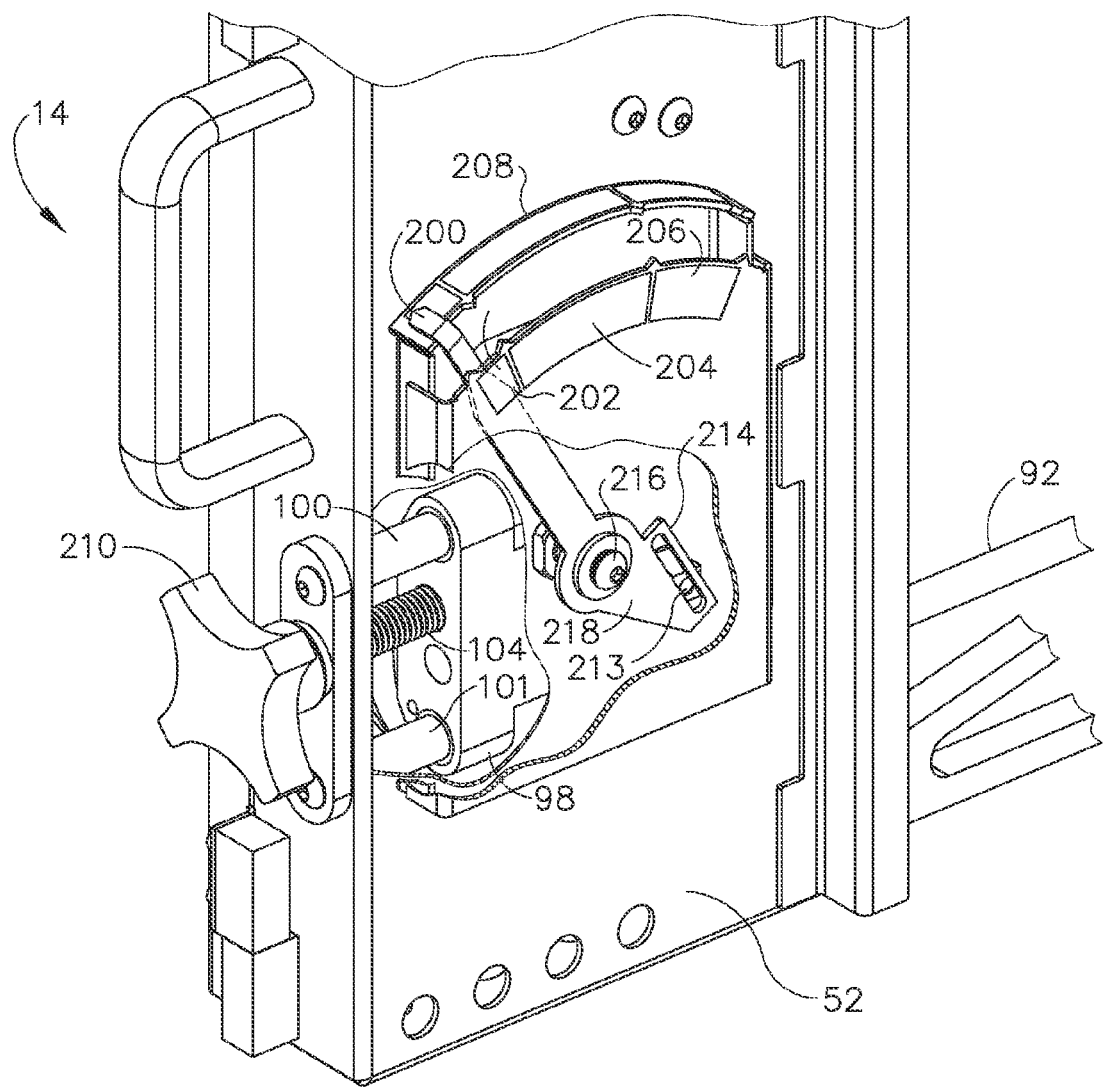
FIG. 28 depicts an enlarged rear perspective cutout view of a gauge mounted to the bow shown in FIG. 24, in accordance with one embodiment.

With reference to FIGS. 27 and 28, preferably, in one embodiment, the tension indicator is a mechanical gauge 200 which indicates the tension on the wire loop 92. Preferably, in one embodiment, the gauge 200 displays an initial range of tension 202 representing an initial amount of tension on the wire loop 92, a preferred range of tension 204 representing a preferred amount of tension on the wire loop 92, and an excessive range of tension 206 representing an excessive amount of tension on the wire loop 92. Preferably, the mechanical gauge includes 200 a needle 208 which is connected with the shaft 212, preferably via a pin 213 located within a channel 214 formed on a base 218 of the needle 208. Preferably, the needle 208 is rotatably mounted onto a housing of the gauge 200 using a fastener 216, such as a screw. Since the needle 208 is connected with the shaft 212, as the shaft 212 moves upon being adjusted using the adjustment device, the needle 208 also moves in turn to display the range of tension in which the wire loop 92 is under.

To operate the device 14 for cutting a length of pipe 10, the device 14 is mounted onto a pipe 10, preferably by wrapping the adjustable strap 40 around the circumference of the pipe 10 and tightened to hold the pipe 10 against the contoured surfaces 22, 24 of the saddle plates 18, 20. The bow 46 is initially in the withdrawn position with the follower nut 116 at the upper end of the feed screw 118 and near the crank 120. A water supply is connected to the input end of the T-union 132 such that water is directed through the nozzles 128, 130. A source of pressurized hydraulic fluid is connected to an input for the motor 90 for rotating the drive wheel 88 and moving the wire loop 92 around the bow 46. With the wire loop 92 rotating in the bow 46, the hex head 106 of the adjustable screw 104 is rotated as needed to adjust the tensioner device 96 to adjust the tension on the wire loop 92. Preferably, the tension on the wire loop 92 is set to an initial amount. Preferably, the initial amount is within an initial range of tension 202 displayed by the tension indicator.

Thereafter, the hand crank 120 can be rotated to urge the bow downward along the longitudinal supports 34, 35 and apply the exposed portion 93 of the wire 92 between the lower ends 50, 52 against the surface of the pipe 10 thereby cutting the pipe 10. The operator will continue to crank the crank 120 to apply appropriate tension to the wire loop 92 and urge the bow downwardly until the wire loop 92 is cut through the diameter of the pipe 10. Preferably, the tension on the wire loop 92 during the cutting operation is kept within a predetermined or preferred amount of tension. Preferably, the preferred amount of tension is within a preferred range of tension 204 displayed by the tension indicator. Preferably, the tension on the wire loop 92 during the cutting operation is kept below an excessive amount of tension. Preferably, the excessive amount is within an excessive range of tension 206 displayed by the tension indicator. If the tension exceeds the preferred amount and enters an excessive amount of tension, the operator, using the visual indicator, can slow down or stop turning the crank 120, in order to reduce or maintain a preferred amount of tension on the wire loop.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

As utilized herein, the terms "approximately," "about," "substantially," and similar terms are intended to have a broad meaning in harmony with the common and accepted usage by those of ordinary skill in the art to which the subject matter of this disclosure pertains, and in one non-limiting embodiment the terms are defined to be within 10%, in another embodiment within 5%, in another embodiment within 1% and in another embodiment within 0.5%. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

While the present invention has been described with respect to a single embodiment, it will be appreciated that many modifications and variations may be made without departing from the spirit and scope of the invention. It is therefore the intent of the appended claims to cover all such modifications and variations that fall within the spirit and scope of the invention. Accordingly, the invention is not to be restricted except in light of the attached claims and their equivalents.

The invention claimed is:

1. A wire saw comprising:
   a bow having a first end, a second end and a bridge portion joining the first and second ends, and an open end having a length (L) from the first end to the second end, wherein the first end, the second end and the bridge portion of the bow define an enclosure; and
   a wire loop movable along a track formed within the bow, wherein an enclosed portion of the wire loop is positioned in the enclosure and enclosed by the first end, the second end and the bridge portion and an exposed portion of the wire loop extends across the open end and is not enclosed by the bow;
   wherein the bow includes a rotatable panel to selectively expose at least a portion of the wire loop positioned in the bow.

2. The wire saw of claim 1, further comprising a tension indicator to provide feedback as to an amount of tension on the wire loop.

3. The wire saw of claim 2, wherein the tension indicator is a visual indicator mounted on a housing of the wire saw.

4. The wire saw of claim 1, wherein the track is formed using a plurality of wheels on the bow, the wheels moving the wire loop along the track.

5. The wire saw of claim 4, wherein the plurality of wheels are positioned in the enclosure and are at least partially enclosed by the bow.

6. The wire saw of claim 5, wherein the plurality of wheels comprise three wheels and the three wheels are positioned in the enclosure and are at least partially enclosed by the bow.

7. The wire saw of claim 1, wherein the wire loop is a diamond wire loop.

8. The wire saw of claim 1, further comprising a cooling system including a water spray on the bow directing water toward the wire loop.

9. The wire saw of claim 1, further comprising a cooling system for actively cooling the wire loop, wherein the cooling system is coupled to and at least partially enclosed by the bow.

10. The wire saw of claim 1, wherein the bow includes two movable panels to selectively expose at least a portion of the wire loop positioned in the bow.

11. A wire saw comprising:
    a bow having a first end, a second end and a bridge portion joining the first and second ends, and an open end having a length (L) from the first end to the second end, wherein the first end, the second end and the bridge portion of the bow define an enclosure; and
    a wire loop movable along a track formed within the bow, wherein an enclosed portion of the wire loop is positioned in the enclosure and enclosed by the first end, the second end and the bridge portion and an exposed portion of the wire loop extends across the open end and is not enclosed by the bow;
    wherein the bow further comprises a back plate, a wall extending from the back plate and a panel movably coupled to the wall, wherein the panel is movable between a first position, in which the panel is coupled to the wall and at least partially encloses the wire loop, and a second position, in which the panel is coupled to the wall and the enclosure is at least partially open to expose at least a portion of the wire loop positioned within the bow.

12. The wire saw of claim 11, further comprising a tension indicator to provide feedback as to an amount of tension on the wire loop.

13. The wire saw of claim 12, wherein the tension indicator is a visual indicator mounted on a housing of the wire saw.

14. The wire saw of claim 11, wherein the track is formed using a plurality of wheels on the bow, the wheels moving the wire loop along the track.

15. The wire saw of claim 14, wherein the plurality of wheels are positioned in the enclosure and are at least partially enclosed by the bow.

16. The wire saw of claim 15, wherein the plurality of wheels comprise three wheels and the three wheels are positioned in the enclosure and are at least partially enclosed by the bow.

17. The wire saw of claim 11, wherein the wire loop is a diamond wire loop.

18. The wire saw of claim 11, further comprising a cooling system including a water spray on the bow directing water toward the wire loop.

19. The wire saw of claim 11, further comprising a cooling system for actively cooling the wire loop, wherein the cooling system is coupled to and at least partially enclosed by the bow.

20. The wire saw of claim 11, wherein the panel is a first panel, the bow further including a second movable panel to selectively expose at least a portion of the wire loop positioned in the bow.

21. A wire saw comprising:
a bow having a first end, a second end and a bridge portion joining the first and second ends, and an open end having a length (L) from the first end to the second end, wherein the first end, the second end and the bridge portion of the bow define an enclosure; and
a wire loop movable along a track formed within the bow, wherein an enclosed portion of the wire loop is positioned in the enclosure and enclosed by the first end, the second end and the bridge portion and an exposed portion of the wire loop extends across the open end and is not enclosed by the bow;
wherein the bow includes a back plate positioned on a first side of a portion of the wire loop, a forward panel positioned on a second side of the portion of the wire loop opposite the first side, a wall extending between the back plate and the forward panel on a third side of the portion of the wire loop and an inner guard that extends between the back plate and the forward panel on a forth side of the portion of the wire loop, wherein the back plate, the wall, the forward panel and the inner guard at least partially define the enclosure to inhibit access to the portion of the wire loop enclosed by the back plate, the wall, the forward panel and the inner guard.

22. The wire saw of claim 21, further comprising a tension indicator to provide feedback as to an amount of tension on the wire loop.

23. The wire saw of claim 22, wherein the tension indicator is a visual indicator mounted on a housing of the wire saw.

24. The wire saw of claim 21, wherein the track is formed using a plurality of wheels on the bow, the wheels moving the wire loop along the track.

25. The wire saw of claim 24, wherein the plurality of wheels are positioned in the enclosure and are at least partially enclosed by the bow.

26. The wire saw of claim 25, wherein the plurality of wheels comprise three wheels and the three wheels are positioned in the enclosure and are at least partially enclosed by the bow.

27. The wire saw of claim 21, wherein the wire loop is a diamond wire loop.

28. The wire saw of claim 21, wherein the forward panel is a first forward panel, the bow further including a moveable second forward panel to selectively expose at least a portion of the wire loop positioned in the bow.

* * * * *